United States Patent [19]

Vassalotti

[11] Patent Number: 4,569,506

[45] Date of Patent: Feb. 11, 1986

[54] SELF-CONTAINED STUD TENSIONER AND TIGHTENER DEVICE

[75] Inventor: Michael Vassalotti, New Milford, Conn.

[73] Assignee: Automation Industries, Inc., Greenwich, Conn.

[21] Appl. No.: 578,004

[22] Filed: Feb. 8, 1984
(Under 37 CFR 1.47)

[51] Int. Cl.[4] ............................................. E21B 19/00
[52] U.S. Cl. .................................................. 254/29 A
[58] Field of Search .................. 254/29 A; 81/57.38; 29/452

[56] References Cited

U.S. PATENT DOCUMENTS 2,866,370 12/1958 Biach ............................... 254/29 A
4,485,677 12/1984 Amelot et al. ................... 254/29 A Primary Examiner—Robert C. Watson
Attorney, Agent, or Firm—Thomas L. Flattery

[57] ABSTRACT

A self-contained tensioner and tightener device for a threaded stud characterized in that an expandable hydraulic tensioning device is disposable between a locking nut and a foundation surface from which the stud projects, and the locking nut and the elements of the tensioning device when removed from the stud are necessarily displaced onto and retained by a take-up finger extending from the tensioning device coaxial with the stud, whereby the entire tensioning and tightening assembly is self-contained and none of its parts necessarily separate from the combination when the combination is removed from the stud.

9 Claims, 2 Drawing Figures

SELF-CONTAINED STUD TENSIONER AND TIGHTENER DEVICE

BACKGROUND OF THE INVENTION

Hydraulic bolt tightener means are in common use for applying equal tension to bolts or studs so as to prevent uneven stress concentration. To avoid the use of special devices which must be moved from one bolt or stud to the next to tension each properly prior to tightening, various forms of hydraulic stud tensioning systems have been built into nut assemblies themselves. U.S. Pat. Nos. 3,362,622 and 4,249,718 describe two forms of such bult-in hydraulic stud tensioning means. In each a tensioning nut is screwed onto the end of the stud and a spacing device is disposed between the tensioning nut and the opposite flange or other foundation surface. After the tensioning nut properly stretches the stud a locking nut within the spacing device is tightened into place, often with the assistance of a tommy bar inserted through an access aperture inside of the spacing device. The tensioning nut and the spacing device are entirely separable from the remainder of the nut assembly when they are taken off the end of the stud.

One of the principal purposes of the present invention is to provide retaining means which holds on the assembly all parts removed from the stud. This is particularly important in installations such as nuclear power facilities where for safety purposes no loose parts are permitted which may accidentally be overlooked during disassembly or reassembly.

BRIEF STATEMENT OF THE INVENTION

A self-contained tensioner and tightener device is provided in accordance with this invention for a threaded stud projecting from a hole in a foundation surface. It comprises an expandable tensioning device which itself comprises a tensioning nut threadable onto the stud in spaced relation to the foundation surface and telescoping annular piston and cylinder elements defining a pressure chamber and loosely encircling the stud between the tensioning nut and the foundation surface. The expandable tensioning device also includes pressuring means communicating with the chamber for forcing the piston and cylinder elements and thus the tensioning nut and foundation surface apart to tension the stud. The invention also includes a spacer sleeve adapted to encircle the stud end portion and tensioning nut in abutting relation with the foundation surface. A locking nut is threadable onto the stud against the spacer sleeve to be tightened on the tensioned stud so that the pressuring means can be deactivated and the tensioning nut loosened. A take-up finger is fixed in relation to the tensioning device coaxial with and spaced closely adjacent the end of the stud and is threaded correspondingly to the stud so that the tensioning nut, the spacer sleeve and the locking nut necessarily move onto and are retained by the finger when removed off the end of the stud.

The aforementioned take-up finger distinguishes the present tensioner and tightener from prior art built-in stud tensioning devices. In addition, the apparatus of the invention is characterized in that the spacer sleeve is disposed between the locking nut and the foundation surface with the tensioning nut enclosed within the spacer sleeve, whereas in prior art devices the spacer sleeve is disposed between the tensioning nut and the foundation surface with the locking nut enclosed within the spacer sleeve. Consequently in the device of the invention there is free access to the locking nut when it is tightened to secure the tensioned stud and no tommy bar need be employed through access means in the spacer sleeve. In the present invention the expandable tensioning device, which operates hydraulically and requires no tool access, is located inside of the spacer sleeve. The locking nut, which does require tool access, is located on the end of the stud beyond the spacer sleeve where it can be easily grasped by a wrench.

DESCRIPTION OF PREFERRED EMBODIMENT

Figure 1:
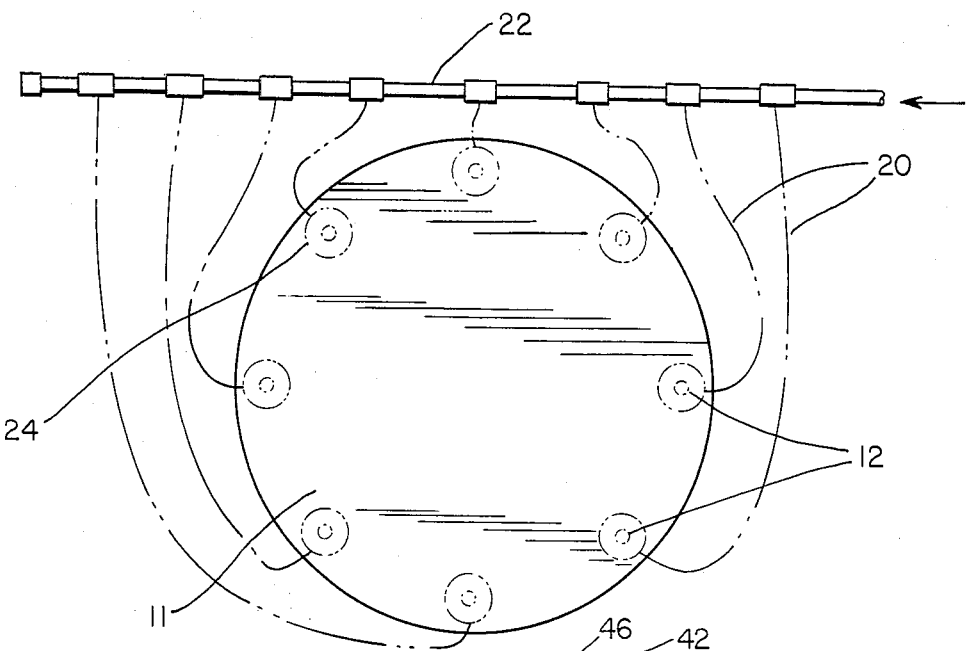
FIG. 1 is a schematic plan view of a circle of studs on a flange each equipped with the tensioner and tightener device of the invention.

Referring to both of the figures, a circular flange 10 is covered by a closure element 11 and is secured in place by eight studs 12. Each of the studs has a lower threaded end portion 13 onto which is fitted a lower nut 14 and a lower washer 15. Each stud 12 extends through a hole 16 in the flange 10 and through an aligned hole 17 of corresponding size in the closure element 11. Each hole 17 opens to a larger well 18 with a side port 19 extending outwardly to the periphery of the closure element 11. A pressure hose 20 with an end fitting 21 extends from each side port 19 to a common hydraulic pressure line 22. The pressurizing medium is preferably oil. Each of the wells 18 holds one of the self-contained tensioner and tightener devices 24 of the invention, the principal purpose of which is to provide means for tensioning its stud 12 to a degree equal to that of the other studs and thus permit it to be tightened in place in a manner which avoids unacceptable concentration of stresses, all without permitting any parts of the assembly to be separated from the rest.

Figure 2:
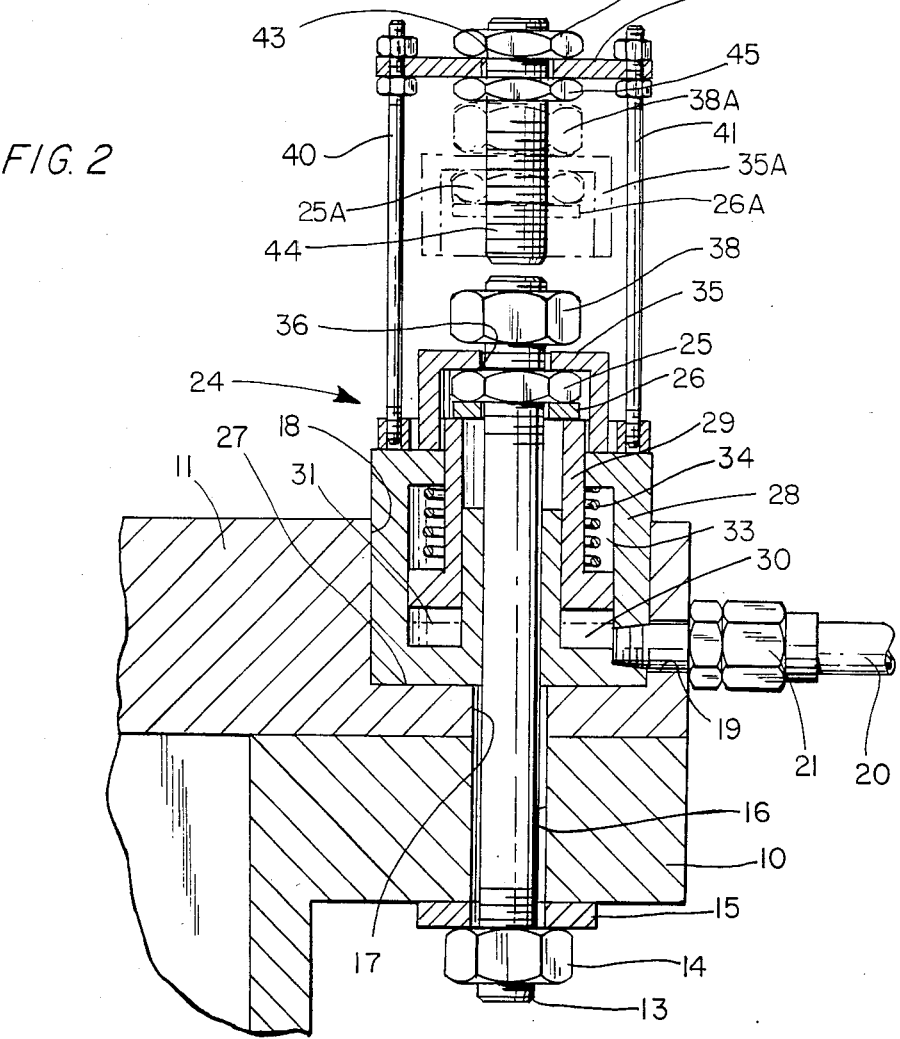
FIG. 2 is an enlarged fragmentary vertical section of one of the devices of the invention.

One of the devices 24 is shown in detail in FIG. 2. Within the well 18 is an expandable tensioning device which comprises a tensioning nut 25 threadable onto the upper end of the stud 12 together with an associated washer 26. The bottom of the well 18 around the hole 17 forms a foundation surface 27 and the tensioning nut 25 and its washer 26 are in spaced relation to that surface 27. An annular cylinder element 28 fits snugly within the well 18 and rests on the foundation surface 27. An annular piston element 29 telescopes within the cylinder element 28 and the two define a single annular pressure chamber 30. The pressure chamber 30 is connected through the end fitting 21 and hose 20 with the hydraulic pressure line 22 all of which constitutes pressuring means for forcing the piston and cylinder elements apart. Some form of limiting stop 31 in the bottom of the pressure chamber, indicated by dotted lines in FIG. 2, establishes the lowermost portion of the piston element 29 within the cylinder element 28 so that the chamber 30 remains somewhat open even when the piston and cylinder elements are fully telescoped together.

Within the space 33 inside the cylinder 28 opposite the chamber 30 and above the face of the piston 29 is a compression spring 34 which urges the piston 29 downwardly toward the limiting stop 31, i.e. in a direction away from that portion of the stud 12 on which the tensioning nut 25 is threaded, and opposite the direction the piston and cylinder elements are urged apart by the pressuring means. It will be evident that upon introduction of pressurized hydraulic fluid, such as oil, into the chamber 31 the piston element 29 is elevated against the force of the spring 34 to apply an upward force against the washer 26 and tensioning nut 25 and thereby place the stud 12 under tension.

Encircling the stud end portion to which the tensioning nut 25 is threaded is an annular inverted cup-shaped spacer sleeve 35, the lower end of which rests on the upper surface of the cylinder element 28 around the piston element 29. Since the spacer sleeve is in abutting relation with the cylinder element 28 and the latter rests directly on the foundation surface 27, it follows that the spacer sleeve is in indirect abutting relation with the foundation surface as well. The upper body of the spacer sleeve 35 is formed with an axial hole 36 through which the upper threaded portion of the stud 12 projects. On that upper threaded portion of the stud 12 is screwed a locking nut 38.

At least two tie rods 40 and 41 are fixed at their lower end to the upper surface of the cylinder element 28 and extend upwardly parallel to one another and to the axis of the stud 12 a substantial distance to support an end bracket 42. The bracket 42 may be held by opposed nuts on respective threadable upper end portions of the tie rods 40 and 41 as shown in FIG. 2. The center of the bracket 42 is formed with a circular hole 43 coaxial with and the same size as the hole 36 in the spacer sleeve 35. Located in the hole 43 is a take-up finger 44 which is threaded throughout its length with threads conforming to those on the stud 12. The upper end of the take-up finger 44 is fastened to the bracket 42 by opposed nuts 45 and 46. The lower end of the take-up finger 44 is spaced very close to the upper end of the stud 12 in the assembled condition of the various parts as shown in FIG. 2, the space preferably being not more than the thickness of the washer 26.

The operation of the self-contained stud tensioner and tightener device of the invention will be described through its cycle of steps starting first with the assembled condition shown in solid lines in FIG. 2. The piston element 29 is shown slightly above the stop 31 which establishes its lowermost starting position and the locking nut 38 is shown in an elevated loosened position rather than tightened flush against the spacer sleeve 35. It will be understood that many of the steps herein described occur simultaneously in all of the devices 24 in a manner known to the prior art.

First the pressure of the oil in the line 22 is increased so that the chamber 30 expands and the piston element 29 rises in the cylinder element 28 against the force of the compression spring 34. This exerts an upward force on the washer 26 and the tensioning nut 25 so as to stretch the stud 12. The locking nut 38 can then be loosened by hand on the upper end portion of the stud 12.

Further unscrewing of the locking nut 38 causes it to move off the upper end of the stud 12 and onto the lower end of the take-up finger 44 and thence upwardly to the dotted line position designated 38A in FIG. 2. At this point the pressuring means can be deactivated so that the spring 34 urges the piston 29 to its lowermost position in the cylinder element 28. Next the spacer sleeve 35 is moved upwardly from the stud 12 onto the take-up finger 44 to the dotted line position indicated as 35A in FIG. 2. The tensioning nut 25 is then unscrewed upwardly off the stud 12 and onto the take-up finger 44 to the position indicated as 25A in FIG. 2. Finally, the washer 26 is similarly displaced from the stud 12 onto the take-up finger 44 to the position shown in 26A of FIG. 2. The end fitting 21 is unscrewed from the cylinder element 28 and the entire device of the invention may then be lifted from the stud 12 with each of the separated parts 26A, 25A, 35A and 38A retained by the take-up finger 44. The closure element 11 is then free to be removed from the flange 10.

Upon reassembly, the device 24 is returned to the well 18 and the pressure hose 20 is connected by its end fitting 21 to the cylinder element 28. The washer 26 is moved from the take-up finger 44 back onto the stud 12 to rest on the top of the piston element 29. The tensioning nut 25 is then turned from the take-up finger 44 downwardly to bear on the washer 26. The spacer sleeve 35 is similarly moved into place and oil pressure is applied to the chamber 30 to lift the piston 29 and tension the stud 12. All of the studs 12 in the circle thereof shown in FIG. 1 are subjected to the same tensioning stress at this point so as to avoid uneven stress concentrations in the studs or in the flange 10 and closure element 11. At this point the locking nut 38 is turned down off the take-up finger 44 and onto the upper end of the stud 12 until it is tightened snugly against the upper surface of the spacer element 35. The oil pressure is then relieved in the chamber 30 and the compression spring 34 returns the piston element 29 to its initial position leaving the stud 12 under tension with the locking nut 38 tightened in place.

It may be desirable in certain situations to provide a snap ring or other such retainer for the lower end of the take-up finger 44 to hold all of the various transfer parts when they are in the dotted line position shown in FIG. 2 so that they remain on the take-up finger 44 when it is moved from the closely spaced position relative to the upper end of the stud 12. Such means are not always necessary, however, and it is to be understood that the parts shown in dotted lines in FIG. 2 are considered to be retained by the take-up finger 44, even though it is possible to slide them off the end of the take-up finger 44 when the device 24 of the invention is separated from the stud 12.

The scope of the invention is to be determined from the following claims rather than from the foregoing preferred embodiment thereof.

I claim:

1. A self-contained tensioner and tightener device for a threaded stud projecting from a hole in a foundation surface comprising
   (a) an expandable tensioning sub-assembly comprising
      (i) a tensioning nut threadable onto said stud in spaced relation to said foundation surface,
      (ii) telescoping annular piston and cylinder elements defining a pressure chamber and loosely encircling the stud between the tensioning nut and the foundation surface, and
      (iii) pressuring means communicating with said chamber for forcing the piston and cylinder elements and thus tensioning nut and foundation surface apart to tension the stud;
   (b) a spacer sleeve adapted to encircle the stud end portion and tensioning nut in at least indirect abutting relation with the foundation surface;
   (c) a locking nut threadable onto the stud so that the pressuring means can be deactivated and the tensioning nut loosened; and (d) a take-up finger fixed in relation to the tensioning device coaxial with and spaced closely adjacent the end of the stud and threaded correspondingly to the stud so that the tensioning nut, spacer sleeve and locking nut necessarily move onto and are retained by the finger when removed off the end of the stud.

2. A self-contained tensioner and tightener device according to claim 1 wherein the cylinder element bears against the foundation surface and the piston element bears against the tensioning nut, and the take-up finger is fixed to the cylinder element.

3. A self-contained tensioner and tightener device according to claim 1 wherein the piston and cylinder elements are spring-biased relative to one another opposite the direction they are moved apart by the pressuring means.

4. A self-contained tensioner and tightener device according to claim 1 wherein the spacer sleeve bears directly against the cylinder element so as to be in indirect abutting relation with the foundation surface.

5. A self-contained tensioner and tightener device according to claim 1 wherein the pressuring means is hydraulic.

6. A self-contained tensioner and tightener device according to claim 1 wherein the piston and cylinder elements define a single annular pressure chamber encircling the stud.

7. A self-contained tensioner and tightener device according to claim 1 wherein a washer is adapted to encircle the stud between the tensioning nut and the piston and cylinder elements, said washer being removable onto said take-up finger.

8. A self-contained tensioner and tightener device according to claim 7 wherein the space between the take-up finger and the end of the stud is not greater than the thickness of said washer.

9. A self-contained tensioner and tightener device having a threaded stud projecting from a hole in a foundation surface comprising
(a) a tensioning nut threadable onto said stud in spaced relation to said foundation surface,
(b) telescoping annular piston and cylinder elements defining a single annular pressure chamber and loosely encircling the stud with the piston element engagable with the tensioning nut and the cylinder element engagable with the foundation surface,
(c) a compression spring within said cylinder urging the piston into said cylinder in a direction away from that portion of the stud on which the tensioning nut is threadable,
(d) hydraulic pressuring means communicating with said chamber for forcing the piston and cylinder elements and thus the tensioning nut and foundation surface apart to tension the stud,
(e) a spacer sleeve adapted to encircle the stud end portion and tensioning nut loosely in abutting relation with the cylinder element and thus indirectly with the foundation surface,
(f) a washer adapted to encircle the stud between the piston element and the tensioning nut,
(g) a locking nut threadable on the stud against the spacer sleeve to be tightened on the tensioned stud so that the pressuring means can be deactivated and the tensioning nut loosened, and
(h) a take-up finger fixed to and extending toward the cylinder element and the foundation surface coaxial with and spaced closely adjacent the end of the stud and threaded correspondingly to the stud so that the washer, tensioning nut, spacer sleeve and locking nut necessarily move onto and are retained by the finger when removed off the end of the stud,
(i) the space between the take-up finger and the stud being not more than the thickness of said washer.

* * * * *